July 7, 1964
A. A. NEUWALD ETAL
3,140,147
SCENTING DEVICE
Filed March 14, 1961
3 Sheets-Sheet 3
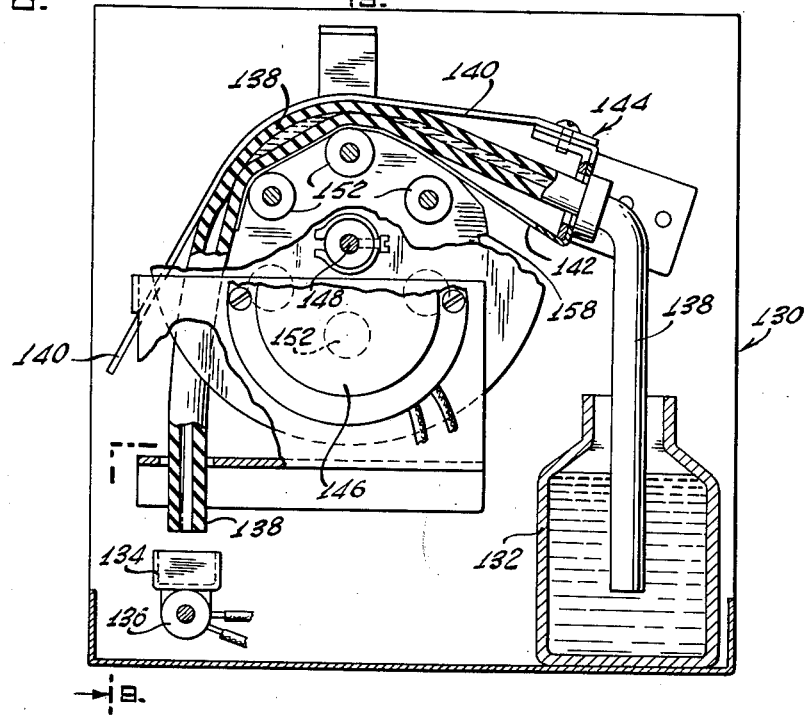
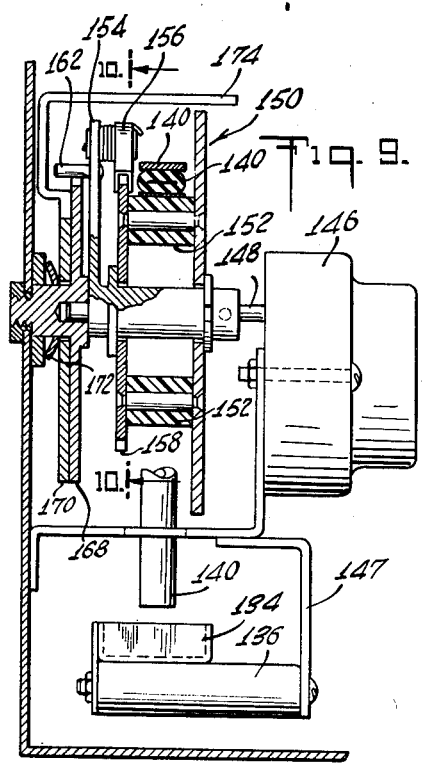
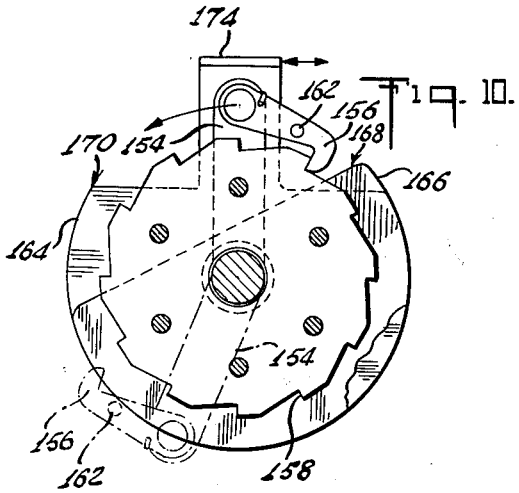
INVENTORS
Alfred A. Neuwald
William F. Donovan
BY
McLew and Toren
ATTORNEYS

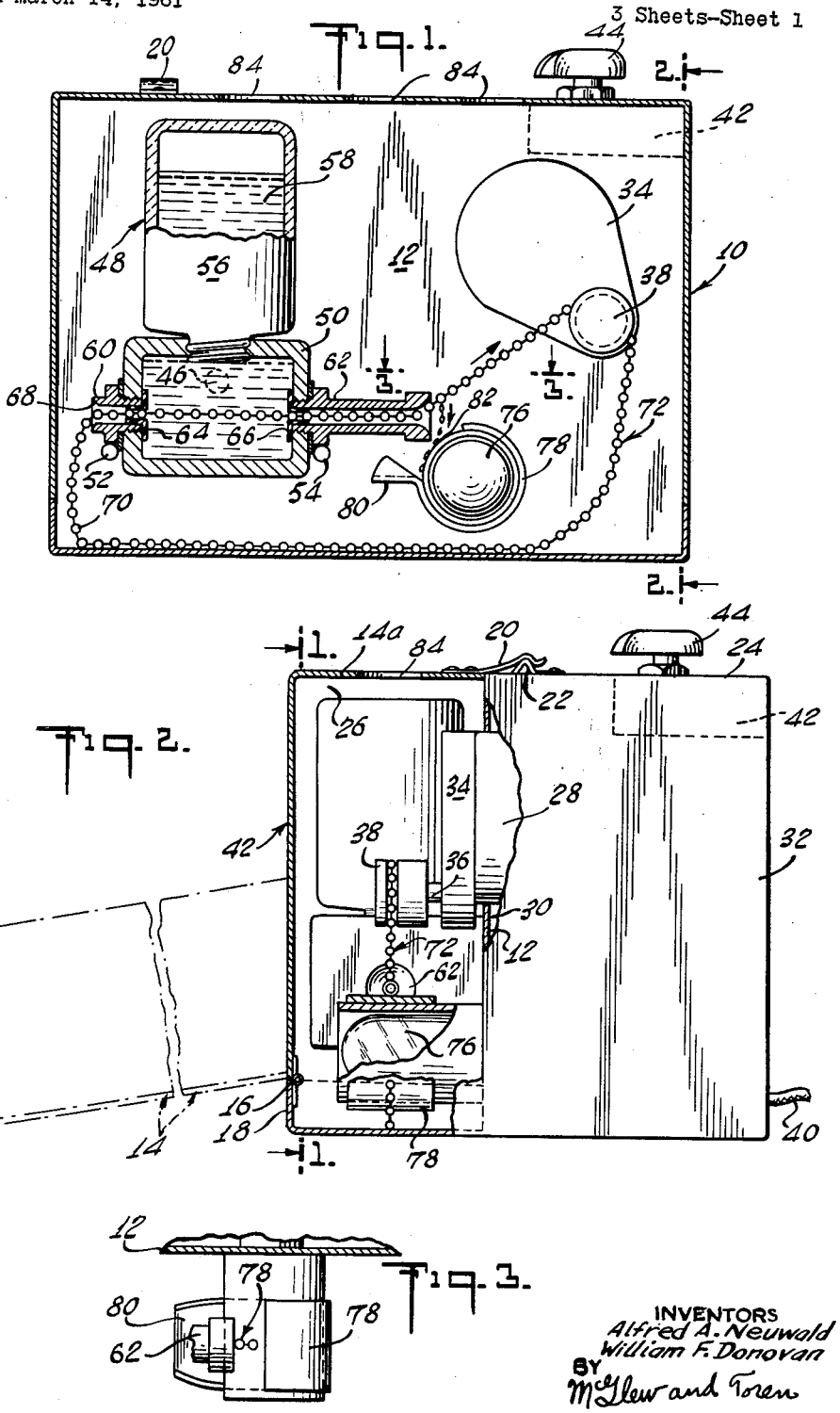

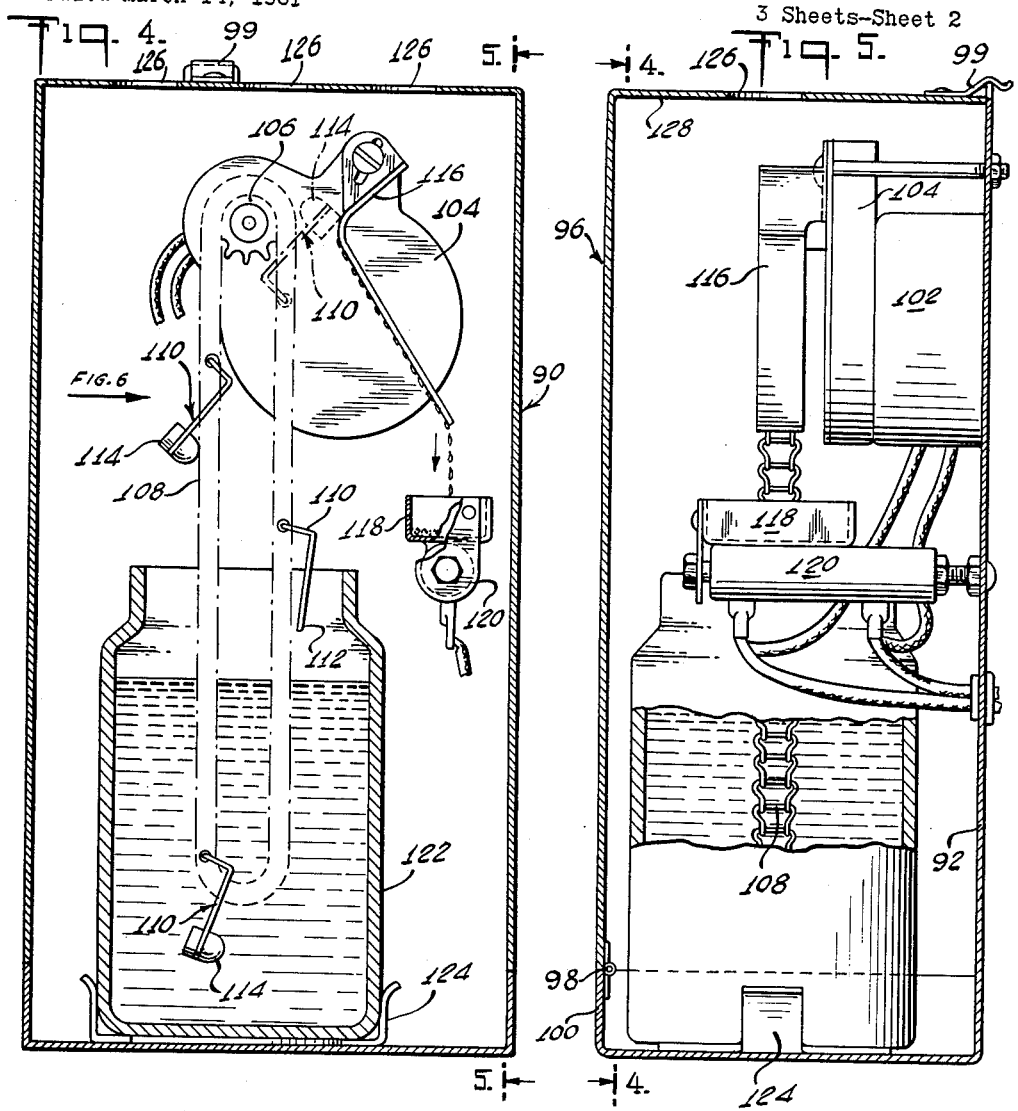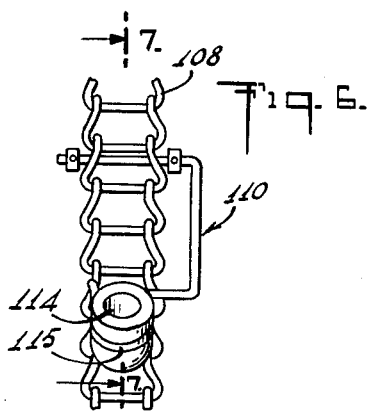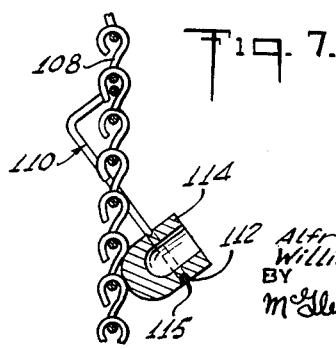

United States Patent Office 3,140,147
Patented July 7, 1964

3,140,147
SCENTING DEVICE
Alfred A. Neuwald, New York, N.Y., and William F. Donovan, Clifton, N.J., assignors to The Fragrance Process Company, Inc., New York, N.Y.
Filed Mar. 14, 1961, Ser. No. 95,525
9 Claims. (Cl. 21—119)

This invention relates in general to vapor producing devices and in particular to a new and useful device for continuously dispensing measured quantities of vaporizable liquid onto a heating element for vaporizing the liquid and including means for controlling the quantities of such liquids which are vaporized.

The present invention has evolved from an appreciation of the fact that merchandise can be sold far better if the area in which the merchandise is exhibited can be permeated with a scent which will suggest the merchandise or which will logically induce a desire on the part of the potential customer to purchase such merchandise. For example, if the air is provided with a scent of perfume it will logically induce sales of such perfume. A far more extensive field, however, for scenting in the sale of merchandise exists in respect to other merchandise such as foods, beverages, and even clothing, furniture, etc. Suggestions of such foods as oranges, strawberries, flavors of puddings, desserts, cereals, etc., and bakery products, for example, may be advantageously created by scenting the area in which these articles are exhibited.

In accordance with the present invention, an apparatus is provided for the controlled measuring and evaporation of a scented material, which includes means for adjusting the output so that the device can be set up in a location to give the precise amount of scent necessary to aid in the exhibition and sale of the merchandise. The invention includes means for continuously delivering small quantities of a vaporizable scent material onto a heating element for evaporation into the atmosphere. Simple means are provided for controlling the rate at which the material is delivered to the evaporator so that the amount of scent in the location can be materially increased or decreased as desired.

In accordance with one embodiment of the invention, small quantities of the vaporizable liquid are advanced out of a container of such liquid by means of a continuous ball or bead chain. The speed and the amount of advance of which is regulated by electrical motor and timing means. A feature of the construction is that the reservoir and dispensing chain are removable from the remaining portion of the apparatus so that the complete vaporizable liquid containing the scented material may be removed for replacement by another unit of a different scent and, thus, intermixing and contamination are avoided. The apparatus advantageously functions with scents which are carried in a liquid carrier in proportions which are controlled to give desirable scenting results for the various commercial merchandising which is desired.

In accordance with another embodiment of the invention, an endless conveyor is arranged with capillary-sized buckets thereon pivotally mounted so that they dip into a liquid reservoir of a material to be dispensed and vaporized. The buckets are advanced to a deflector plate where the liquid is deflected out of the buckets and down onto a heating element for vaporization. Control of the amount of liquid which is vaporized is accomplished by the number of buckets arranged on the conveyor as well as by the speed of advance of the conveyor.

In accordance with still another embodiment of the invention, a flexible conduit is trained between a reservoir of vaporizable liquid and a heating element, and a wheel having a plurality of spoke elements is mounted to rotate in a position at which the spoke elements bear against and compress the flexible conduit. The arrangement is such that once the flexible conduit is primed with the vaporizable liquid, the rotation of the spokes to compress the conduit effects displacement and pumping of the liquid from the reservoir to the heating elements. In this embodiment, a continuously operating electric motor is arranged to drive the wheel having the spokes at a constant speed. A camming arrangement is employed for periodically disconnecting the spoke wheel from the electric motor drive. The camming arrangement is adjustable for regulating the periods at which the wheel is rotated and hence the output of the dispensing and vaporizing device.

Accordingly, it is an object of this invention to provide an improved means for vaporizing materials in the atmosphere or space area.

A further object of the invention is to provide means for delivering quantities of vaporizable liquid to a heating element for the vaporization thereof.

A further object of the invention is to provide means for delivering quantities of a vaporizable liquid scented material to a heating element for vaporization thereon and further including means for controlling the quantities of liquid which are delivered for the purpose of regulating the amount of scented material which is vaporized into a given area.

A further object of the invention is to provide a scenting device, including means for scenting an area with a preselected quantity of scent.

A further object of the invention is to provide a scenting device including a heating element and a reservoir of vaporizable liquid, and means such as an endless beaded chain arranged to move through the reservoir of liquid and through a conduit of substantially the same diameter as the beads of the chain to dispense the liquid from the reservoir as the chain is moved.

A further object of the invention is to provide a vaporizing device including a heating element and means for delivering prescribed quantities of vaporizable liquid to the heating element, including an endless conveyor having a plurality of buckets thereon, said conveyor being trained to run into said reservoir to effect filling of said buckets, and including means to deflect the contents of said buckets onto the heating element.

A further object of the invention is to provide a vaporizing device including a heating element, and means to direct quantities of vaporizable liquid onto the heating element including a flexible conduit trained to run from a reservoir of the liquid to the heating element, and a wheel having spokes thereon mounted for rotation so that the spokes contact the flexible conduit and pump liquid during rotation, and including means for controlling the rotation of the wheel in order to vary the output of the vaporizer.

A further object of the invention is to provide a vaporizing device which is rugged in construction, simple in design and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a transverse section of a vaporizing device taken along the line 1—1 of FIG. 2 and constructed in accordance with the invention;

FIG. 2 is a partial section and partial elevation taken in the vicinity of line 2—2 of FIG. 1;

FIG. 3 is a fragmentary section taken on the line 3—3 of FIG. 1;

FIG. 4 is a transverse section taken on the line 4—4 of FIG. 5 of another embodiment of the invention;

FIG. 5 is a section taken on the line 5—5 of FIG. 4;

FIG. 6 is a fragmentary side elevation of a portion of the endless conveyor and bucket construction;

FIG. 7 is a section taken on the line 7—7 of FIG. 6;

FIG. 8 is a transverse section of still another embodiment of the invention;

FIG. 9 is a section taken on the line 9—9 of FIG. 8; and

FIG. 10 is a section taken on the line 10—10 of FIG. 9.

Referring to the drawings in particular, the invention embodied therein in FIGS. 1 to 3 includes a scenting device including a housing generally designated 10 having an upstanding dividing wall 12 and a cover 14 which is hingedly connected at 16 to an upstanding portion 18 of a rear wall and which includes a top portion 14a having a resilient latch 30 which is engageable with an upstanding cleat 22 on a stationary top wall portion 24 of the housing. In FIG. 2, the cover 14 is indicated in a dotted line position in which an end chamber or compartment 26 defined between the cover and the partition wall 12 is exposed. The cover is also indicated in a solid line closed position.

In accordance with the invention, a driving motor 28 is disposed in a motor compartment 30 defined between partition wall 12 and front wall 32. The motor 28 is mounted on the partition wall 12 and includes a drive 34 which extends into the compartment 26 and has an exposed shaft 36 which rotates a sprocket wheel 38. The motor 28 is connected via an outlet cord 40 to a suitable source of electrical power and the speed thereof is regulated by a timing mechanism 42 which is connected to the power source 40 and the motor 28. The timing mechanism includes means for interrupting the current supply to the motor for prescribed periods and is controlled by a timing regulator control knob 44 mounted on the top wall 24. The knob 44 may be set to permit continuous operation of the motor as well as intermittent operation thereof over a wide range of selected time intervals.

The wall 12 carries an outstanding rod 46 which is provided to receive and support a reservoir and chain dispensing assembly generally designated 48. For this purpose the assembly 48 includes a rectangular reservoir container 50 having an opening (not shown) on a wall arranged to receive the projecting rod 46. Supporting spindles 52 and 54 are arranged on the wall 12 on each side of the reservoir 50 to support the latter in an upright position.

The reservoir 50 is provided with a threaded opening in which is positioned a container or bottle 56 filled with a vaporizable liquid 58 which advantageously has a scent of an article to be merchandised, for example, hot chocolate, freshly baked rolls, strawberries, etc. The liquid completely fills the interior of the reservoir 50.

Each end of the reservoir 50 is threaded and receives respective fittings 60 and 62. Each fitting is provided with suitable packings 64 and 66, respectively, to provide a seal at these locations. Fitting 60 is of relatively short length and includes an interior bore 68 of a size slightly larger than the diameters of individual balls or beads 70 of an endless ball or bead chain generally designated 72. The bead chain 72 is trained to run over the sprocket wheel 38 and through the bore 68 and the interior of the reservoir 50 and out through a bore 74 of an elongated fitting 62.

The exterior end of the fitting 62 is flared and is disposed over a heating element which, in this instance, is an incandescent bulb 76. The heating element is surrounded by a deflector plate 78 which deflects droplets 82 of the liquid into a vaporizing pan 80. The chain is continuously moved by the sprocket 38 so that as it is advanced through the bore 74 of the elongated fitting 62 it traps liquid between adjacent beads 70 and causes the liquid to drop onto the heating element deflector 78 and into the vaporizing pan 80. Heat from the incandescent bulb 76 causes vaporization of the liquid and the liberated scent exits through openings 84 defined in the top wall 14a.

It can be seen that the control of the speed of the chain by the motor 28 driving the sprocket wheel 38 will effectively control the amount of liquid which is dispensed onto the heating element and hence the quantity of scent which will be liberated into the surrounding space. The timing control knob 44 is provided to permit the control of the speed and duration of operation of the motor and hence regulates the quantity of scent which is liberated.

In FIGS. 4 to 7 another embodiment of the invention is provided which includes a housing generally designated 90 having a stationary end wall 92, bottom wall 94 and a cover member generally designated 96 which is hinged at its lower end at 98 to an upstanding portion 100 of a front wall. The cover 96 includes a flexible latch 99 which fits over an extension of the rear wall 92 to hold the cover in a closed position.

Mounted on the wall 92 is a motor 102 having a drive 104 arranged to rotate a sprocket wheel 106 which carries an endless chain 108. The chain 108 is provided with a plurality of lever arm members generally designated 110 which are pivotally connected at one end to the chain and which carry, in a looped portion 112 at the opposite free end, a small sized bucket 114. The loop portion 112 is resilient and the buckets are provided with an annular groove 115 which may be aligned with the resilient ends of the loop portion 112 and pressed into or out of place thereon. In FIG. 4 one of the lever arms 110 is indicated without a bucket 114. This is to show how the quantity of liquid which is dispensed during movement of the endless chain 108 may be varied by removing one or more buckets.

Rotation of the sprocket 106 by the motor 102 causes advance of each of the lever arms 110 with the buckets at the ends 112 thereof. A deflector plate 116 is arranged adjacent the sprocket 106 in a position to contact each bucket 114 as it is moved up and around the sprocket 106 by the chain. Contact by the plate 116 spills the liquid contents which the bucket 114 has picked up. The contents move downwardly along a curved extension of the plate 116 onto a vaporizing pan 118. The vaporizing pan 118 is mounted on an end of a heating element 120 which is secured to the wall 92. Suitable electrical wire connections are provided for both the resistance element 120 and the motor 102.

In the construction described in respect to FIGS. 4 to 7, it should be appreciated that the buckets are of such small size that capillary action effectively holds the vaporizable liquid which is picked up from a container 122 into which endless chain 108 is trained to run so that the liquid must be deflected out of the bucket by contact with the deflector plate 116.

Suitable brackets 124 are provided on the bottom wall 94 to hold the container 122. The speed of advance of the chain 108 through the container 122 does, of course, influence the amount of liquid which is discharged onto the deflector plate and into the vaporizing pan 118. The vaporizing of the liquid caused by the heating element 120 causes the scent to be expelled through openings 126 in a top wall 128 of the cover 96.

In FIGS. 8 to 10 there is indicated still another embodiment of the invention in which there is provided a housing generally designated 130 having means for supporting a liquid container of vaporizable material 132 at one end and includes a vaporizing pan 134 arranged over heating element 136 at an opposite end. A flexible conduit 138 is primed with vaporizable liquid and positioned at one end in the container 132 with its intermediate end held between flexible elements 140 and 142 of a clamp member generally designated 144 and its other end overlying the vaporizing pan 134. A motor 146 is mounted on a bracket 147 which also holds the resistance element 136. The motor 146 is provided with a shaft 148 which drives a wheel member 150 having a plurality of spokes 152 which are rotated beneath the flexible plate portion 142. The path of rotation is such that the plate 142 and the conduit 138 are compressed and liquid which is trapped in the conduit is pumped from the container 132 to the vaporizing pan 134.

A feature of this construction is that a constant speed motor 146 may be employed and means are provided for periodically interrupting the drive from the motor shaft 148 to the wheel 150 having the spokes 152. For this purpose a rotatable arm member 154 is affixed to the shaft 148 for rotation therewith and it carries a pivotally mounted pawl 156 at its free end. The pawl 156 is engageable with teeth 158 of a spoked outer portion of the wheel 150. The pawl is biased into contact with the teeth by means of a spring 160. In order to periodically interrupt the driving engagement of the pawl 156 with the teeth 158 of the wheel 150, the pawl is provided with a roller follower 162 which rides on the outer peripheral surfaces 164 and 166 of cooperable cam members, a fixed one 168 and a movable one generally designated 170. The movable cam member 170 is rotatably mounted on a stationary hub member 172 and it may be rotated by means of a handle 174 to dispose the surface 164 either completely in alignment with the surface 166 or arranged so that it extends circumferentially therebeyond. The roller follower 162 will only permit engagement of the pawl 156 when it is not in contact with one of the surfaces 166 or 164. Since the cam plates 168 and 170 carrying the surfaces may be shifted relatively, the time interval at which the pawl is in contact with the teeth 158 may be varied. This, of course, produces a variation in the rotation of the wheel 150 and a similar variation in the amount of liquid which is dispensed onto the vaporizing pan 134.

Thus, the invention provides simple means for delivering measured quantities of vaporizable liquid into association with a heating element for vaporizing the liquid. The device finds many applications in the sale of commercial merchandise in provision of a controlled scenting of the surrounding space for inducing sales of such merchandise.

While specific embodiments of the invention have been shown and described in detail to illustrate the application of the invention principles, it will be understood that the invention may be embodied otherwise without departing from such principles.

What is claimed is:

1. A scenting device comprising a housing, a motor mounted on said housing, a sprocket wheel rotatably driven by said motor, a heating element mounted on said housing, and a vaporizable liquid dispensing assembly including a reservoir having orifice openings at each end and an endless beaded chain extending through said orifice openings, said beads being of a diameter slightly smaller than said orifice openings, said chain being engageable with said sprocket for rotation thereof, one of said orifice openings being disposed above said heating element whereby movement of said chain causes trapping of liquid between said beads and dispensing onto said heating element.

2. A scenting device according to claim 1, wherein said dispensing assembly is removably mounted on said housing.

3. A scenting device according to claim 1, wherein said dispensing assembly includes an elongated fitting defining one of the orifices in said liquid container, said fitting having a free end disposed to overlie said heating element, and said chain being advanced out of said orifice by movement of said sprocket.

4. A scenting device according to claim 1, wherein said dispensing assembly includes a container having orifice openings at each end, and a separate container having a threaded neck threaded into said first container in an inverted position.

5. In a device comprising a vaporizing plate and means for heating said plate for the purpose of vaporizing liquid delivered thereto for adding the vapor to the atmosphere such as for scenting the atmosphere, the improvement comprising a reservoir of scented vaporizable liquid including a container having orifice openings at each end, means for delivering a measured quantity of vaporizable liquid from said container including an endless chain having beads of a diameter slightly smaller than said orifice openings, said chain trained to run through said container and through the orifice openings, and means to move said chain to advance liquid from said container outwardly through said orifice openings.

6. In a scenting device comprising a housing, a motor mounted on said housing, a sprocket wheel rotatably driven by said motor, a heating element on said housing adjacent said motor, and pin means formed on said housing, the improvement comprising a removable vaporizable liquid dispensing assembly supported on said pin means including a reservoir container having inlet and outlet conduits at each end with the bores thereof arranged in alignment, and an endless beaded chain extending through said inlet conduit, said reservoir container and out said outlet conduit, said chain having beads of a diameter to effect entrapment of liquid from said container reservoir between adjacent beads and movement thereof out through said outlet conduit when said endless beaded chain is moved, said chain being engageable with the sprocket for movement by rotation of the sprocket, said outlet conduit adapted to be located above the heating element in a position to cause liquid trapped between the beads of the chain to exit from said outlet conduit and fall on the heating element for vaporization thereof, and a supply container connected to said reservoir container in a position to supply said reservoir container with a vaporizable liquid.

7. A device for delivering measured quantities of liquid such as to heating means for vaporizing the liquid comprising a container having orifice openings at each end, an endless beaded chain trained to run through said orifice openings and said container, the beads of said chain being spaced to permit entrapment of liquid therebetween for the bringing of air into said container through one orifice and for delivering measured quantities of liquid from said container through the other of said orifices when said chain is moved, and means for moving said chain.

8. A device for delivering measured quantities of liquid from a container, comprising a container for said liquid having orifice openings at each end and an endless chain trained to run into the orifice opening at one end through the container and out the orifice opening at the opposite end, said chain having beads thereon spaced to permit trapping of liquid therebetween as the beads are moved through said orifice openings, said chain being movable to bring air into said container at one of said orifice openings and deliver liquid through the opposite opening of the container.

9. A device according to claim 8, including an elongated tube positioned in one of said orifice openings and extending outwardly from said container, said chain being trained to run through said tube.

References Cited in the file of this patent

UNITED STATES PATENTS

| 2,244,180 | Williams et al. | June 3, 1941 |
| 2,308,138 | Williams | Jan. 12, 1943 |
| 2,312,730 | Ring | Mar. 2, 1943 |
| 2,361,663 | Stine | Oct. 31, 1944 |
| 2,758,412 | Loibl | Aug. 14, 1956 |